(12) United States Patent
Boyd et al.

(10) Patent No.: US 7,779,088 B2
(45) Date of Patent: *Aug. 17, 2010

(54) AUTONOMIC LEARNING METHOD TO LOAD BALANCE OUTPUT TRANSFERS OF TWO PEER NODES

(75) Inventors: Kenneth Wayne Boyd, Tucson, AZ (US); Kenneth Fairclough Day, III, Tucson, AZ (US); Philip Matthew Dudas, Tucson, AZ (US); John Jay Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/021,867

(22) Filed: Jan. 29, 2008

(65) Prior Publication Data

US 2008/0126452 A1    May 29, 2008

Related U.S. Application Data

(63) Continuation of application No. 10/617,932, filed on Jul. 11, 2003, now Pat. No. 7,370,089.

(51) Int. Cl.
*G06F 15/16* (2006.01)
(52) U.S. Cl. .................. 709/219; 709/217; 709/229; 709/232; 711/112; 711/162
(58) Field of Classification Search ................ 709/230, 709/231, 217, 219, 229, 232; 370/229, 395.2; 711/114, 112, 113, 162; 714/20; 710/20
See application file for complete search history.

(56) References Cited

U.S. PATENT DOCUMENTS 5,459,864 A    10/1995    Brent et al.

(Continued)

FOREIGN PATENT DOCUMENTS

JP    06250983    9/1994

OTHER PUBLICATIONS

RD 43125; Mar. 2001, No. 443; pp. 464-465.

(Continued)

*Primary Examiner*—Thu Ha T Nguyen
(74) *Attorney, Agent, or Firm*—Griffiths & Seaton PLLC (57) ABSTRACT

Disclosed are a system, a method, and a computer program product to provide for the optimization of the output transfer load balance between the peer computers transferring data to one or more storage devices. The peer computers receive, organize and transfer the data to storage devices. The data set is composed of a plurality of data transfers. After an initial division of the data transfers between the two peers, each peer will have assigned responsibility for a number of data transfers. If the one of the peer computers completes offloading transactions earlier than the other peer, then the peer that is still transferring data will employ the other peer to execute a portion of the remaining data transfers. The operation of the system is symmetrical in that either peer may assist the other peer depending upon which peer has idle time. In addition the operation is autonomous and self-adjusting resulting in the peer nodes optimizing the size of the portion of data transfers that are reassigned during the operation of the invention resulting in the minimization of idle time for either peer. The self-adjusting feature allows the system to react to changing conditions that affect data transfer rates to the storage devices.

21 Claims, 7 Drawing Sheets

U.S. PATENT DOCUMENTS

| | | | |
|---|---|---|---|
| 6,363,462 B1 * | 3/2002 | Bergsten | 711/162 |
| 6,640,241 B1 | 10/2003 | Ozzie et al. | |
| 6,678,788 B1 * | 1/2004 | O'Connell | 711/114 |
| 6,801,949 B1 | 10/2004 | Bruck et al. | |
| 7,089,446 B2 | 8/2006 | Boyd et al. | |
| 7,370,235 B1 * | 5/2008 | Gulve et al. | 714/20 |
| 2003/0233455 A1 | 12/2003 | Leber et al. | |
| 2004/0264471 A1 | 12/2004 | Boulay et al. | |
| 2005/0120082 A1 | 6/2005 | Hesselink et al. | |
| 2006/0149806 A1 | 7/2006 | Scott et al. | |
| 2006/0242238 A1 | 10/2006 | Issa | |
| 2007/0022174 A1 | 1/2007 | Issa | |
| 2007/0174471 A1 | 7/2007 | Van Rossum | |
| 2007/0226368 A1 | 9/2007 | Strickland | |
| 2008/0133767 A1 * | 6/2008 | Birrer et al. | 709/231 |

OTHER PUBLICATIONS

IEEE, Comp. Arch. News; vol. 21, No. 2; pp. 76-86.

* cited by examiner

AUTONOMIC LEARNING METHOD TO LOAD BALANCE OUTPUT TRANSFERS OF TWO PEER NODES

CLAIM TO DOMESTIC PRIORITY

The present application is a continuation application of pending U.S. application Ser. No. 10/617,932, filed Jul. 11, 2003 and claims priority to said application under 35 U.S.C. 119(e).

CROSS-REFERENCES TO RELATED APPLICATIONS

The present application is related to application U.S. application Ser. No. 10/618,242, filed Jul. 11, 2003, now U.S. Pat. No. 7,047,379, issued May 16, 2006; and to U.S. application Ser. No. 10/618,400, filed Jul. 11, 2003, now U.S. Pat. No. 7,251,691, issued Jul. 31, 2007, both of which are hereby incorporated by reference in their entirety.

TECHNICAL FIELD

This invention concerns a system to maintain an optimized balance of outbound transfers between two peer nodes that are transferring data to one or more storage devices.

BACKGROUND OF THE INVENTION

Data storage systems may maintain more than one copy of data to protect against losing the data in the event of a failure of any of the data storage components. A secondary copy of data at a remote site is typically used in the event of a failure at the primary site. Secondary copies of the current data contained in the primary site are typically made as the application system is writing new data to a primary site. In some data storage systems the secondary site may contain two or more peer computers operating together as a backup appliance to store the data in one or more storage devices. Each peer computer receives inbound data from the primary site and transfers the data to a storage controller, storage device(s), or other computers for backup storage of the data. This type of system could be used for a disaster recovery solution where a primary storage controller sends data to a backup appliance that, in turn, offloads the transfers to a secondary storage controller at a remote site. In such backup systems, data is typically maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary storage and a secondary storage controller may be provided to control access to the secondary storage.

The backup appliance maintains consistent transaction sets, wherein application of all the transactions to the secondary device creates a point-in-time consistency between the primary and secondary devices. For each consistent transaction set, there will be one data structure created that will contain information on all outbound transfers in the set. This structure will be maintained on both of the peer nodes of the backup appliance. The backup appliance will maintain consistent transactions sets while offloading the transactions sets to the secondary device asynchronously. Both peer nodes in the backup appliance may transfer the data to any of the storage devices. To obtain the shortest transfer time it is necessary to divide the data transfers between the peers. An equal division of the data transfers between the two peers may not be optimal because the latency time to transfer data to a particular storage device may be different for each peer. This may result in the first peer finishing before the second peer, resulting in idle time for the first peer. In the case where the first peer finishes offloading transactions earlier than the second peer, it may be beneficial for the first peer node to assist the second peer node to complete the remaining transactions. In addition, the peer nodes should adjust the division of data transfers between the peers to minimize idle time at either peer for the present and future consistent transaction sets.

Prior art systems distribute data movement tasks among multiple queue processors that each have access to a common queue of tasks to execute. Each of the queue processors has a queue of its own work and is able to access each of the other queue processor's queue to submit tasks. This forms a tightly coupled system where every queue processor in the system can access the other queue processor's tasks. Tasks are submitted without any knowledge of the impact on the overall system operation. In certain situations it may not be beneficial to transfer tasks because of overhead costs that may affect the overall system operation. The overhead costs may result in a longer time to complete the task than if the task had not been transferred. In addition the prior art systems do not optimize the operation of the system by adjusting the size of the tasks to transfer. Adjustment of the size of the tasks to transfer is important to react to changing operating conditions that affect the time to transfer data to the storage devices.

There is a need to divide the data transfers between two peer computers to achieve an optimal minimum transfer time to transfer all of the data in a data set and to adjust the division of data transfers to react to varying conditions.

SUMMARY OF THE INVENTION

It is an object of the present invention to provide a method to share the transfer load between two peer computers transferring data to storage devices. Disclosed are a system, a method, and a computer program product to provide for the optimization of the output transfer load balance between two peer computers transferring data to one or more storage devices. The peer computers receive, organize and transfer the data to storage devices. The data set received may be a consistent transactions set or other type of data set for storage on one or more storage devices. The data set is composed of a plurality of data transfers. Each data transfer is an equal size block of data. The number of data transfers may vary for each data set received. The data transfers are initially divided between the two peer computers resulting in each peer having responsibility for a number of data transfers. Each of the peer computers receives all of the data transfers in the set, so that each peer has access to the entire set of data. The present invention operates by managing the assignments of data transfers for each peer computer and no data is transferred between the peers as the assignments change.

After the initial division of the data transfers between the two peers, each peer will have assigned responsibility for a number of data transfers. If the one of the peer computers completes offloading transactions earlier than the other peer, then the peer that is still transferring data will employ the other peer to execute a portion of the remaining data transfers. The peer computers communicate with each other to determine if it is necessary for either peer to assist the other with data transfers. If the first peer is idle after completing data transfers it sends a messages to the other peer to offer assistance. The second peer receives the message and compares the number of transfers that remain to a threshold to determine if it is efficient to request assistance from the first peer. If it is not efficient for the first peer to assist because of the overhead associated with reassigning the data transfers, then the second peer responds with a "no assistance needed message". If it is efficient for the first peer to assist, then a portion of the remaining data transfers are reassigned to the first peer. The operation of the system is symmetrical in that either peer may assist the other peer depending upon which peer has idle time. In addition the operation is autonomous and self-adjusting resulting in the peer nodes optimizing the size of the portion of data transfers that are reassigned during the operation of the invention resulting in the minimization of idle time for either peer. The self-adjusting feature allows the system to react to changing conditions that affect data transfer rates to the storage devices.

For a more complete understanding of the present invention, reference should be made to the following detailed description taken in conjunction with the accompanying drawings.

DETAILED DESCRIPTION OF THE PREFERRED EMBODIMENTS

This invention is described in preferred embodiments in the following description. The preferred embodiments are described with reference to the Figures. While this invention is described in conjunction with the preferred embodiments, it will be appreciated by those skilled in the art that it is intended to cover alternatives, modifications, and equivalents as may be included within the spirit and scope of the invention as defined by the appended claims.

Figure 1:
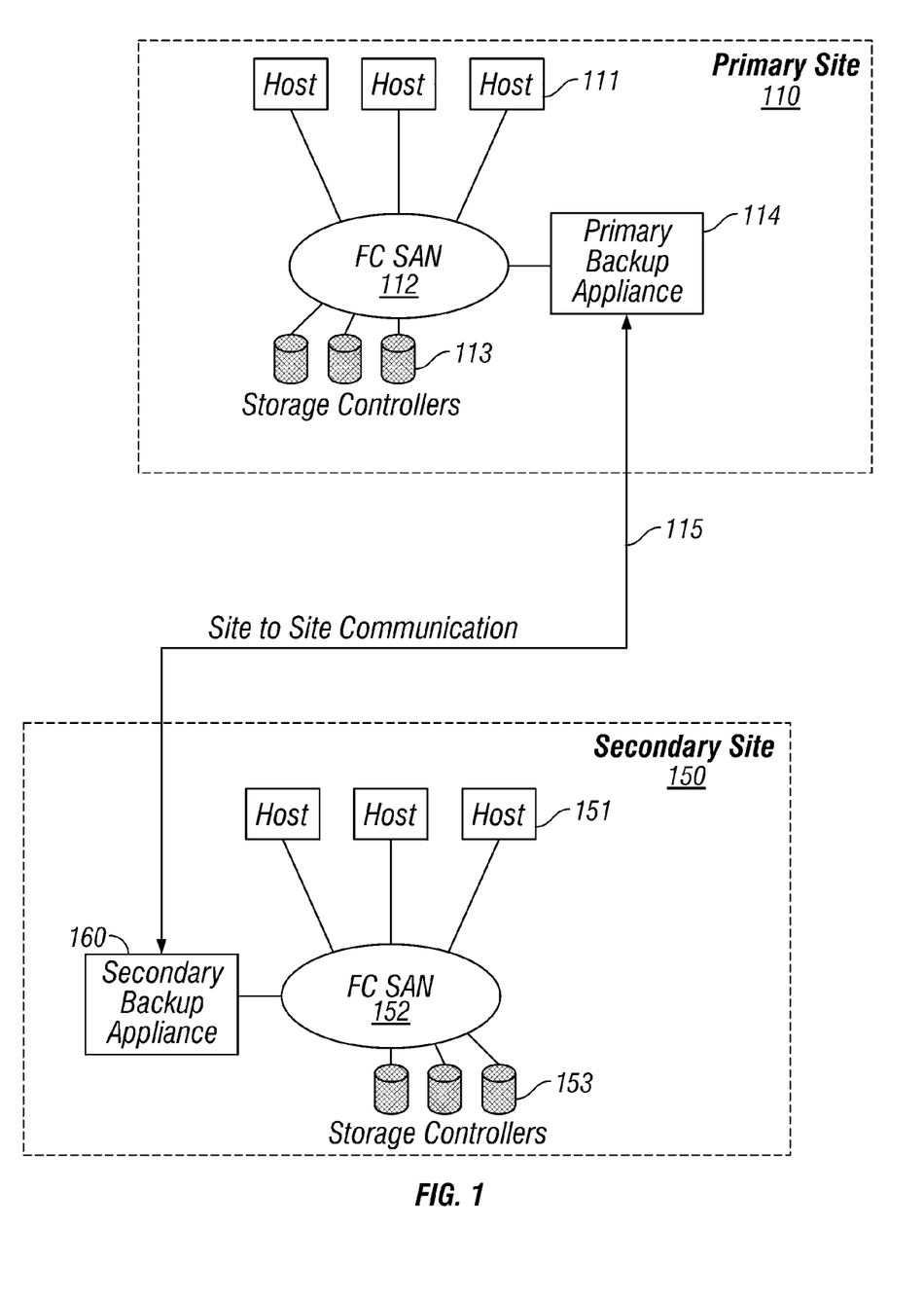
FIG. 1 is a block diagrammatic representation of a data storage network with primary and secondary sites.

Data storage systems may maintain more than one copy of data at secondary data storage sites to protect against losing the data in the event of a failure of any of the data storage components at the primary site. FIG. 1 shows a block diagram of a data storage system with a primary site 110 and secondary site 150. Primary site 110 and secondary site 150 are data storage sites that may be separated by a physical distance, or the sites may be located in close proximity to each other. Both the primary site 110 and secondary site 150 have one or more host computers 111, 151, a communication network within each site 112, 152, storage controllers 113, 153, and a communication network 115, between the sites. The host computers 111, 151, store and retrieve data with respect to the storage controllers 113, 153, using the site communication network 112, 152. The site communication network(s) 112, 152 may be implemented using a fiber channel storage area network (FC SAN). Data is transferred between the primary site 110 and secondary site 150 using communication network 115 through primary backup appliance 114 and secondary backup appliance 160. A secondary copy of the data from the primary site 110 is transferred to and maintained at the secondary site 150. In the event of a failure at the primary site 110 processing may be continued at secondary site 150. Because the physical distance may be relatively large between the primary site 110 and secondary site 150, the communication network 115 is typically slower than the communication network within each site 112, 152. Because of the relatively slow communication network 115 between the sites, consistent transaction sets are sent from primary site 110 to the secondary site 150 to ensure a point in time consistency between the sites. Consistent transaction sets are described in application entitled "Method, System and Article of Manufacture for Creating a Consistent Copy", Application #10339957, filed on Jan. 9, 2003 of which is hereby incorporated by reference in its entirety. At the secondary site 150 the consistent transaction set is received and then transferred to various data storage devices for permanent storage.

Figure 2:
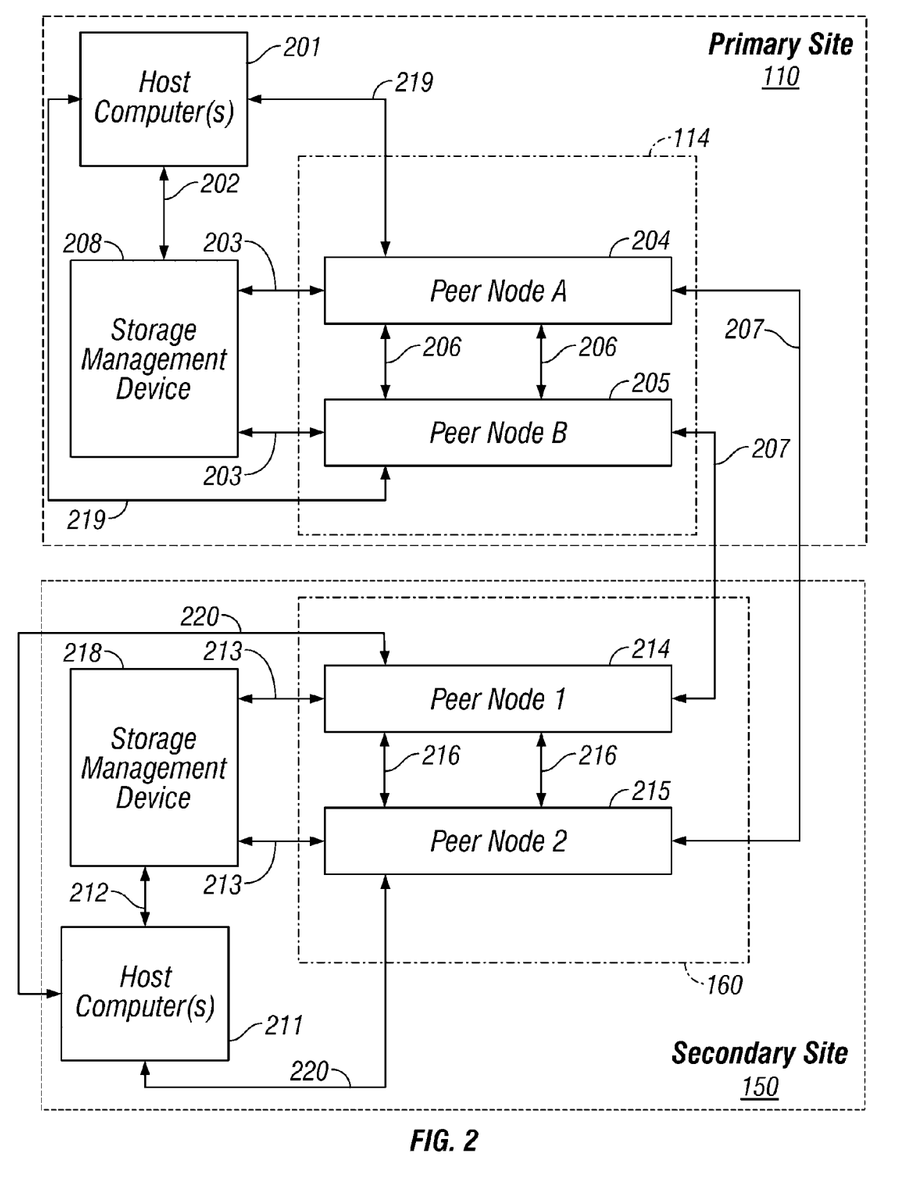
FIG. 2 is a block diagrammatic representation of a portion of the components located at the primary and secondary sites.

FIG. 2 is a block diagrammatic representation of a portion of the components of FIG. 1. At the primary site 110, host computer(s) 201 communicates with storage management device 208 using communication line(s) 202. The storage management device(s) 208 may comprise any storage management system known in the art, such as a storage controller, server, enterprise storage server, etc. Primary backup appliance 114 is comprised of peer node A 204, peer node B 205 and communication line(s) 206. Primary backup appliance 114 may have more or less components than shown in FIG. 2. Storage management device(s) 208 communicates with peer node A 204 and peer node B 205 using communication line(s) 203. Host computer(s) 201 may alternatively communicate directly with peer node A 204 and peer node B 205 using communication lines(s) 219. Herein references to peer node(s), peer computer(s), and peer(s) all refer to the same device(s). Peer node A 204 and peer node B 205 communicate with each other using communication line(s) 206. Communication lines 202, 203 and 206 may be implemented using any network or connection technology known in the art, such as a Local Area Network (LAN), Wide Area Network (WAN), Storage Area Network (SAN), the Internet, an Intranet, etc. Communication between any of the components may be in the form of executable instructions, requests for action, data transfers, status, etc.

At the secondary site 150 host computer(s) 211 communicates with storage management device 218 using communication line(s) 212. The storage management device(s) 218 may comprise any storage management system known in the art, such as a storage controller, server, enterprise storage server, etc. Secondary backup appliance 160 is comprised of peer node 1 214, peer node 2 215 and communication line(s) 216. Secondary backup appliance 160 may have more or less components than shown in FIG. 2. Storage management device(s) 218 communicates with peer node 1 214 and peer node 2 215 using communication lines 213. Host computer(s) 211 may alternatively communicate directly with peer node 1 214 and peer node 2 215 using communication line(s) 220. Peer node 1 214 and peer node 2 215 communicate with each other using communication lines 216. Communication lines 212, 213 and 216 may be implemented using any network or connection technology known in the art, such as a Local Area Network (LAN), Wide Area Network (WAN), Storage Area Network (SAN), the Internet, an Intranet, etc. The communication may be one or more paths between the components and not limited to the number of paths shown in FIG. 2. Communication between any of the components may be in the form of executable instructions, requests for action, data transfers, status, etc.

Primary site 110 and secondary 150 site communicate with each other using communication lines 207. Communication lines 207 may exist over a relatively large physical distance compared to communication lines 202, 203, 206, 212, 213 and 216. Because of the physical separation of the primary 210 and secondary 220 locations, the transfer rate or bandwidth of communication lines 207 may be relatively slow compared to communication lines 202, 203, 206, 212, 213 and 216. Communication lines 207 may be implemented using any connection technology known in the art such as the Internet, an Intranet, etc.

For the present invention, primary site host computer(s) 201 sends data for storage to storage management device 208 using communication line(s) 202. The storage management device 208 transfers this data to primary backup appliance 114 to create one or more backup copies of the data at a remote site. Alternatively, primary site host computer(s) 201 sends data directly to primary backup appliance 114 using communication line(s) 219 and then sends the same data to storage management device 208 using communication line(s) 202. Alternatively, primary site host computer(s) 201 sends data to storage management device 208 that passes through an intelligent switch that forwards a copy of the data to both primary backup appliance 114 and storage management device 208. The data is grouped into a consistent transaction set by peer node 1 204 and peer node 2 205 as it arrives from either storage management device 208 over communication lines 203, primary site host computer(s) 201, or an intelligent switch. Upon accumulating an entire consistent transaction data set, peer node A 204 and peer node B 205 transfer the consistent transaction set to peer node 1 214 and peer node 2 215 at the secondary site 150 using communication lines 207. Peer node 1 214 and peer node 2 215 transfer the entire consistent transaction set to storage management device 218 for storage using communication lines 213. Host computer(s) 211 may retrieve data from storage management device 218 using communication line(s) 212.

Figure 3:
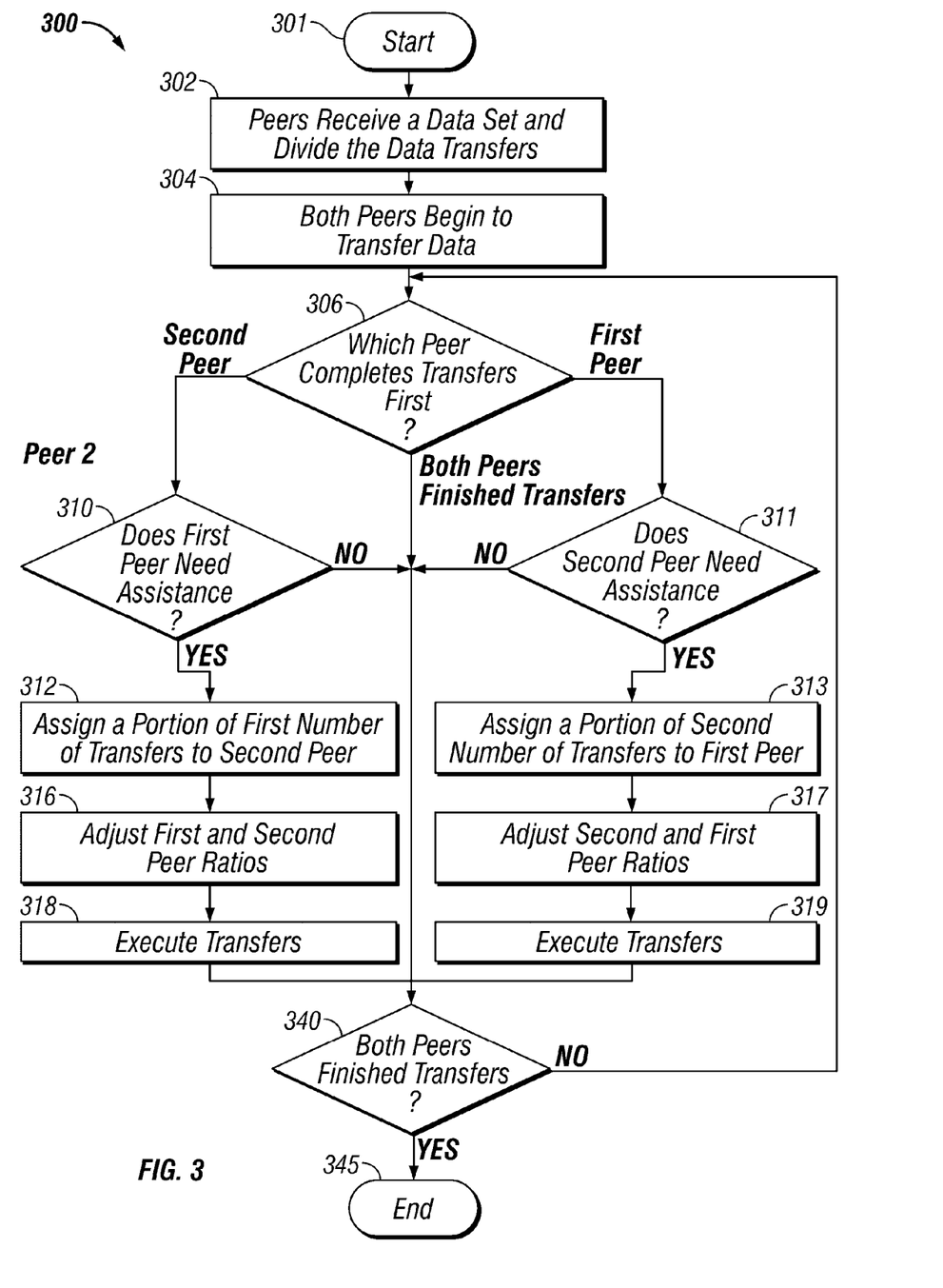
FIG. 3 is a flowchart of the method used to balance the data transfer load of two peer computers.

FIG. 3 shows flowchart 300 detailing the operation of the system to balance the output transfer load for peer node 1 214 and peer node 2 215 as they transfer data to one or more storage devices associated with storage management device(s) 218. Referring to FIG. 3, at step 302 peer node 1 214 and peer node 2 215 receive a data set. The data set received may be a consistent transactions set or other type of data set for storage on one or more storage devices. The data set is composed of a plurality of data transfers. Each data transfer is an equal size block of data. The number of data transfers may vary for each data set received. The data transfers are initially divided between peer node 1 214 and peer node 2 215 resulting in each peer having responsibility for data transfers. Both peer node 1 214 and peer node 2 215 receive all of the data transfers in the set, either from the primary site or they mirror the data to each other so that they both have the entire set of data. The present invention operates by managing the assignments of data transfers for each peer node. No data is transferred between the peers as the assignments change. There are many methods that could be used to do the initial assignments of the data to each peer node. For example, the data transfers could be divided equally between peer node 1 214 and peer node 2 215 based upon the size of each data transfer.

After the initial division of the data transfers between the two peers, each peer will have assigned responsibility for a number of data transfers. Peer node 1 214 is assigned responsibility for transferring a first number of data transfers of the data set to one or more storage devices. Peer node 2 215 is assigned responsibility for transferring a second number of data transfers of the data set to one or more storage devices. The assigned responsibility for the data transfers will herein be referred to as assigning the data transfers to the particular peer. Assignment of the data transfers to a peer for the present invention means that the peer will take all steps necessary to execute the assigned data transfers. At step 304 peer node 1 214 and peer node 2 215 begin to execute the data transfers by simultaneously transferring data to the storage devices. At step 306 the progress of peer node 1 214 and peer node 2 215 is examined to determine if one of the peers has completed transferring data to the storage devices. If peer node 1 214 and peer node 2 215 finish transferring data for the data set at approximately the same time then control flows to the end at step 345. If peer node 1 214 finishes transferring data before peer node 2 215 then at step 306 control flows to step 311. If peer node 2 215 finishes transferring data before peer node 1 214 then at step 306 control flows to step 310. An explanation of the execution of step 311 and the steps that follow step 311 will be given first followed by an explanation of the execution of step 310 and the steps that follow step 310.

At step 311 peer node 1 214 and peer node 2 215 communicate with each other to determine if peer node 2 215 needs assistance to transfer a portion of the second number of data transfers of the data set. One implementation of step 311 is detailed by flowchart 400 shown in FIG. 4. At step 402 the first and second peer ratios are determined. The first and second peer ratios determine the number of data transfers that will be offloaded to the assisting peer by the peer requesting assistance and are explained in greater detail below. A determination of the second peer ratio is necessary to determine at step 311, if peer node 2 215 needs assistance. The first and second peer ratios are determined at step 402 assuming that peer node 2 215 needs assistance, however, the first and second peer ratios are not actually adjusted until step 317 (explained below) under the condition that the result of step 311 is that peer node 2 215 needs assistance. If the result of step 311 is that peer node 2 215 does not need assistance then the first and second peer ratios determined at step 402 are discarded and the values of the first and second peer ratios previous to the execution of step 402 are retained for further use. If the result of step 311 is that peer node 2 215 needs assistance then the first and second peer ratios determined at step 402 are used at step 317 to adjust the previous values of the first and second peer ratios.

Figure 6:
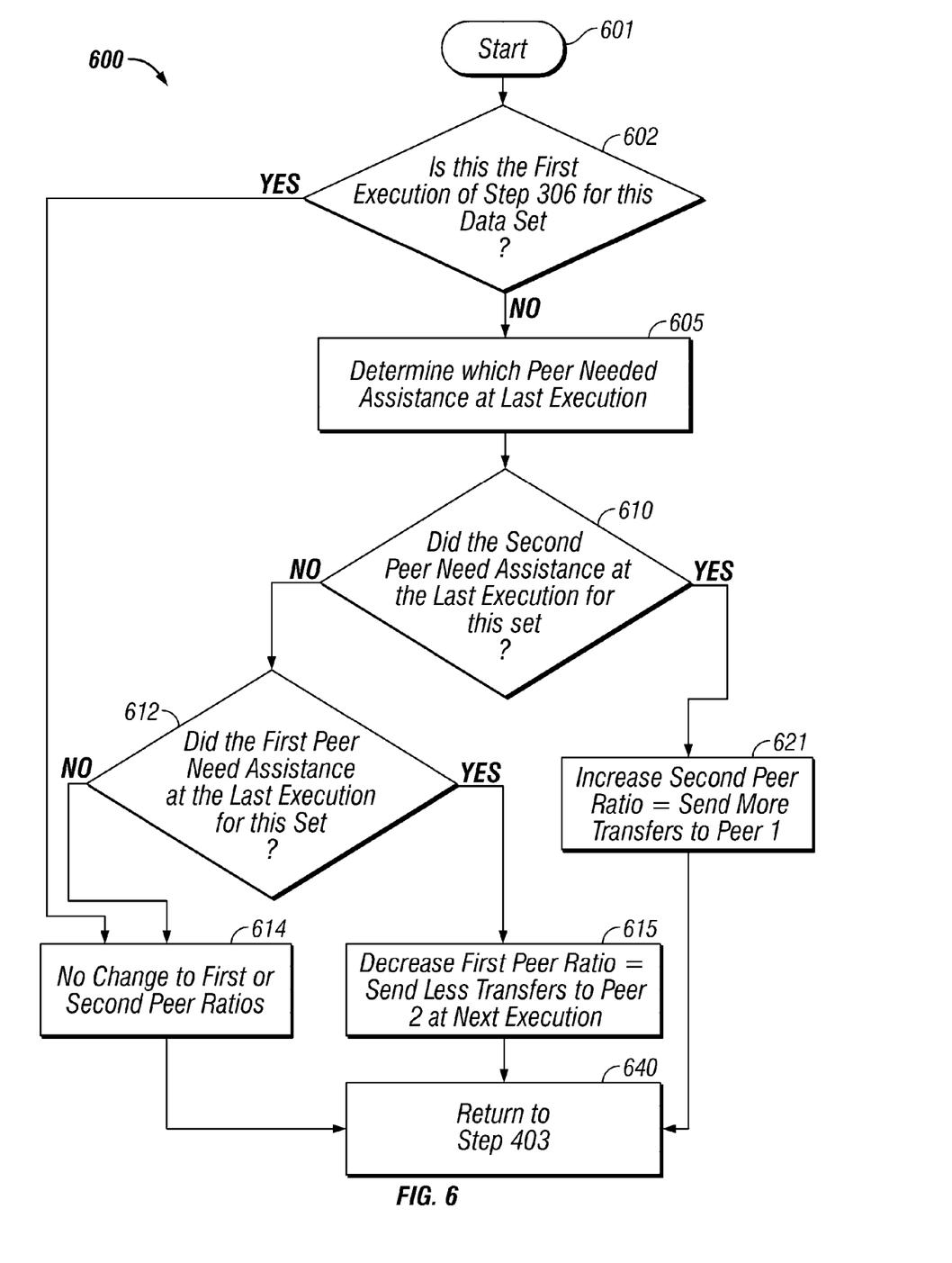
FIG. 6 is a flowchart of the method used to determine the first and second peer ratios when the second peer computer needs assistance.

One implementation of step 402 to determine the first and second peer ratios is detailed by flowchart 600 shown in FIG. 6. If this is the first execution of step 306 for this data set then step 602 transfers control to step 614, resulting in no change to the first or second peer ratios. The first and second peer ratios are not changed if this is the first execution of step 306 for this data set because the ratios are either at an initial value or at a value as the result of previous adjustments from the operation of the present invention. The second peer ratio and the first peer ratio are only changed as a result of either peer node 1 214 or peer node 2 215 accepting assistance with data transfers on a previous execution of steps 310 or 311 for the present data set that is being transferred to the storage devices. The present invention uses the previous values for second peer ratio and the first peer ratio for the first instance of either peer needing assistance with data transfers for the present data set. Each time a new data set is received the present invention begins operation at step 301.

Figure 4:
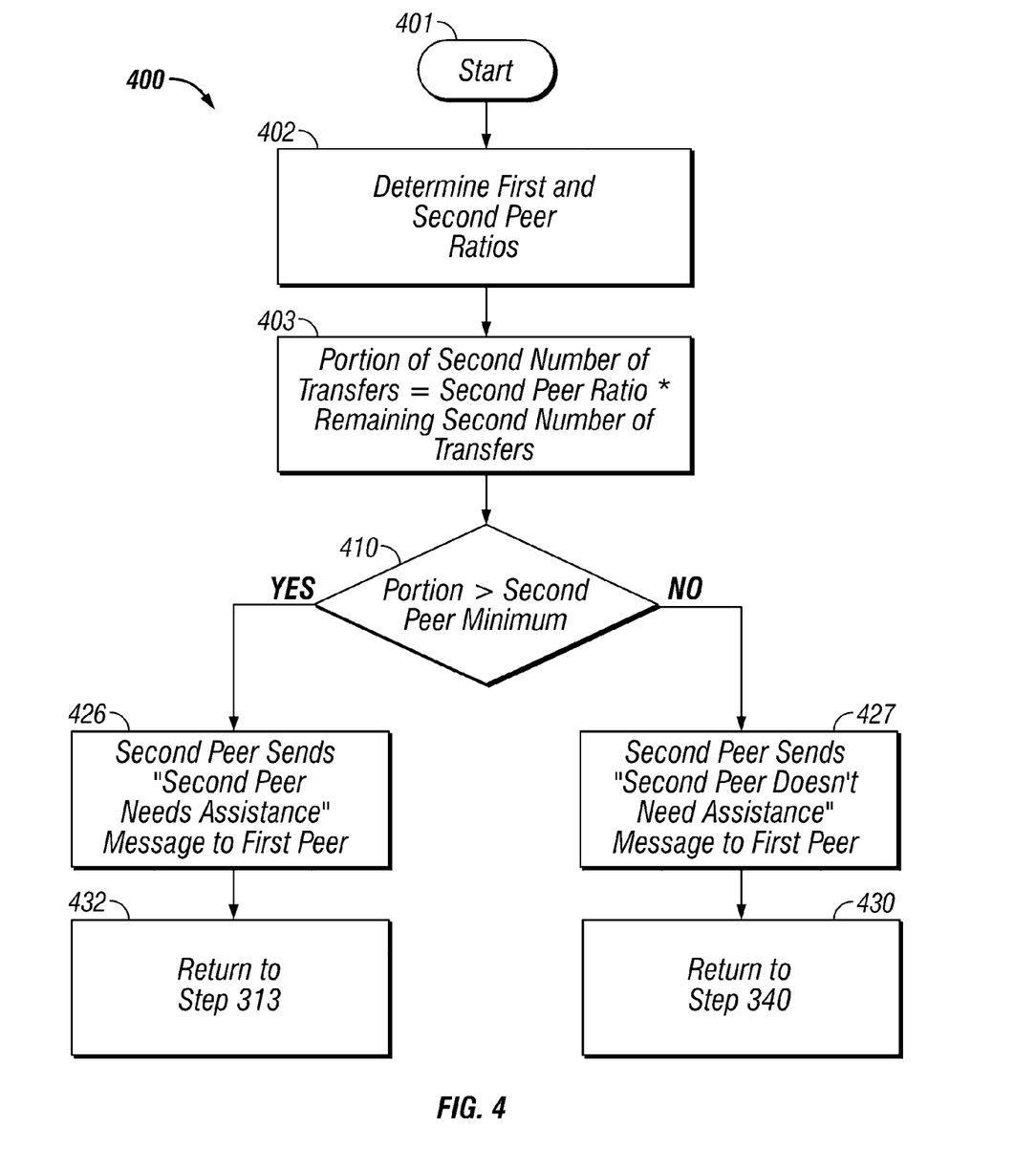
FIG. 4 is a flowchart of the method used to determine if a second peer needs assistance to transfer data to storage devices.

After execution of step 614, step 640 is executed resulting in returning back to execution of step 403 of flowchart 400 shown in FIG. 4. If this is not the first execution of step 306 for this data set, then step 602 transfers control to step 605, where a determination of which peer needed assistance after execution of the steps that follow step 306 (FIG. 3) for the present data set is made. If at the previous execution of the steps that follow step 306 for the present data set, peer node 2 215 needed assistance, then step 610 transfers control to step 621. At step 621 the second peer ratio is increased resulting in a larger portion of the second number of transfers being assigned to peer node 1 214 when step 313 is executed (explained below). The second peer ratio is increased or decreased by a second increment value. The second increment is optimized to have a quick response to changing conditions and also to provide a stable system. After execution of step 621, step 640 is executed resulting in returning back to execution of step 403 of flowchart 400 shown in FIG. 4.

If at the previous execution of the steps that follow step 306 for the present data set, peer node 2 215 did not need assistance, then step 610 transfers control to step 612. If at step 612 it is determined that the previous execution of the steps that follow step 306 for the present data set, peer node 1 214 needed assistance, then step 612 transfers control to step 615. At step 615 the first peer ratio is decreased resulting in a smaller portion of the first number of transfers being assigned to peer node 2 215 the next time step 312 (explained below) is executed. After execution of step 615, step 640 is executed resulting in returning back to execution of step 403 of flowchart 400 shown in FIG. 4.

If at step 612 it is determined that the previous execution of the steps that follow step 306 for the present data set, peer node 1 214 did not need assistance, then step 612 transfers control to step 614, resulting in no change to the second peer ratio. After execution of step 614, step 640 is executed resulting in returning back to execution of step 403 of flowchart 400 shown in FIG. 4.

At step 403 a calculation of a portion of the second number of transfers is executed using the results of step 402. The portion of the second number of transfers is equal to a second peer ratio multiplied by the remaining second number of transfers. The remaining second number of transfers is the difference between the second number of transfers that peer node 2 215 originally had responsibility for offloading and the second number of transfers that peer node 2 215 has already transferred to the storage devices. The remaining second number of transfers is a positive number. The second peer ratio is the ratio of the portion of remaining second number of transfers to the remaining second number of transfers. The second peer ratio is dynamically adjusted during the operation of the present invention and is described in more detail below. A first peer ratio that functions with peer node 1 214, in a similar manner as the second peer ratio functions with peer node 2 215 is described below when the execution of step 310 and the steps that follow step 310 are explained.

At step 410 the portion of the second number of transfers is compared to a second peer minimum. The second peer minimum is the minimum number of transfers necessary for peer node 1 214 to assist peer node 2 215 with data transfers. The second peer minimum is necessary to prevent peer node 2 215 from sending data transfers to peer node 1 214 if the second number of transfers is small enough that by the time peer node 1 214 would be able to complete the transfers, peer node 2 215 could have completed the transfers. The second peer minimum is determined by an examination of the network configuration and the latency of the communications between the peer computers. The second peer minimum must be large enough for it to be advantageous for peer node 1 214 to assist peer node 2 215 with data transfers after accounting for the overhead of the communications between the peers and other delays necessary to complete the entire operation. A utility program that examines the current network conditions and estimates the delays that exist to complete the transfers could determine the second peer minimum. Alternatively, the second peer minimum may be set to a value that depends upon the portion of the second number of transfers by either a fixed relationship such as a specified percentage or another relationship that considers network conditions. In any implementation it is expected that the second peer minimum may vary dynamically.

If at step 410 the portion of the second number of transfers is less than or equal to the second peer minimum then step 427 is executed. At step 427 peer node 2 215 sends a "peer node 2 215 does not need assistance" message to peer node 1 214 and then executes step 430. When peer node 1 214 receives the "peer node 2 215 does not need assistance" message from peer node 2 215, peer node 1 214 takes no further action to assist peer node 2 215 until step 340 is executed. At step 430 the control returns to flowchart 300 (FIG. 3) at step 340. Execution of step 340 and the steps that follow step 340 are explained below.

If at step 410 the portion of the second number of transfers is greater than the second peer minimum then step 426 is executed. At step 426 peer node 2 215 sends a "peer node 2 215 needs assistance" message to peer node 1 214. This starts a process that will result in peer node 1 214 being assigned the responsibility for transferring the portion of the second number of transfers (explained below). Step 432 is executed after execution of step 426. At step 432 the control returns to flowchart 300 (FIG. 3) at step 313. The messages between the peers regarding the need for assistance may consist of the text shown in the flowcharts, text described in this description, other messages, coded information, numbers representing bit positions or other forms of communication between electronic devices know in the art.

Execution of step 313 and the steps that follow step 313 are now explained. Step 313 is executed as a result of a determination at step 311 that peer node 2 215 needs assistance with data transfers. At step 313, peer node 1 214 is assigned responsibility for transferring the portion of the second number of transfers to the storage devices. At step 317 peer node 1 214 receives transfer information from peer node 2 215. The transfer information includes exact information on the portion of the second number of transfers that are reassigned to peer node 1 214. Peer node 1 214 receives the information specifying the portion of the second number of transfers and assigns the portion of the second number of data transfers as the first number of data transfers so that peer node 1 214 operates on the data transfers in the same manner as the first number of data transfers that peer node 1 214 was assigned at step 302. At step 317 the first and second peer ratios are adjusted according to the determination made at step 402. The first and second peer ratios are adjusted as a result of the decision at step 311 that peer node 2 215 needs assistance with data transfers.

At step 319 peer node 1 214 begins to transfer the data to one or more storage devices. Peer node 2 215 continues to transfer the remaining second number of transfers calculated at step 403 and explained above. After execution of step 319, step 340 is executed. Execution of step 340 and the steps that follow step 340 are explained below.

If peer node 2 215 finishes transferring data before peer node 1 214, the decision at step 306 results in the execution of step 310. The description of the execution of step 310 and the steps that follow step 310 is similar to the description of the execution of step 311 and the steps that follow step 311. The execution of step 310 and the steps that follow step 310 are now explained.

At step 310 peer node 1 214 and peer node 2 215 communicate with each other to determine if peer node 1 214 needs assistance to transfer a portion of the first number of data transfers of the data set. One implementation of step 310 is detailed by flowchart 500 shown in FIG. 5. At step 502 the first and second peer ratios are determined. A determination of the first peer ratio is necessary to determine at step 310, if peer node 1 214 needs assistance. The first and second peer ratios are determined at step 502 assuming that peer node 1 214 needs assistance, however, the first and second peer ratios are not actually adjusted until step 316 (explained below) under the condition that the result of step 310 is that peer node 1 214 needs assistance. If the result of step 310 is that peer node 1 214 does not need assistance then the first and second peer ratios determined at step 502 are discarded and the values of the first and second peer ratios previous to the execution of step 502 are retained for further use. If the result of step 310 is that peer node 1 214 needs assistance then the first and second peer ratios determined at step 502 are used at step 316 to adjust the previous values of the first and second peer ratios.

Figure 7:
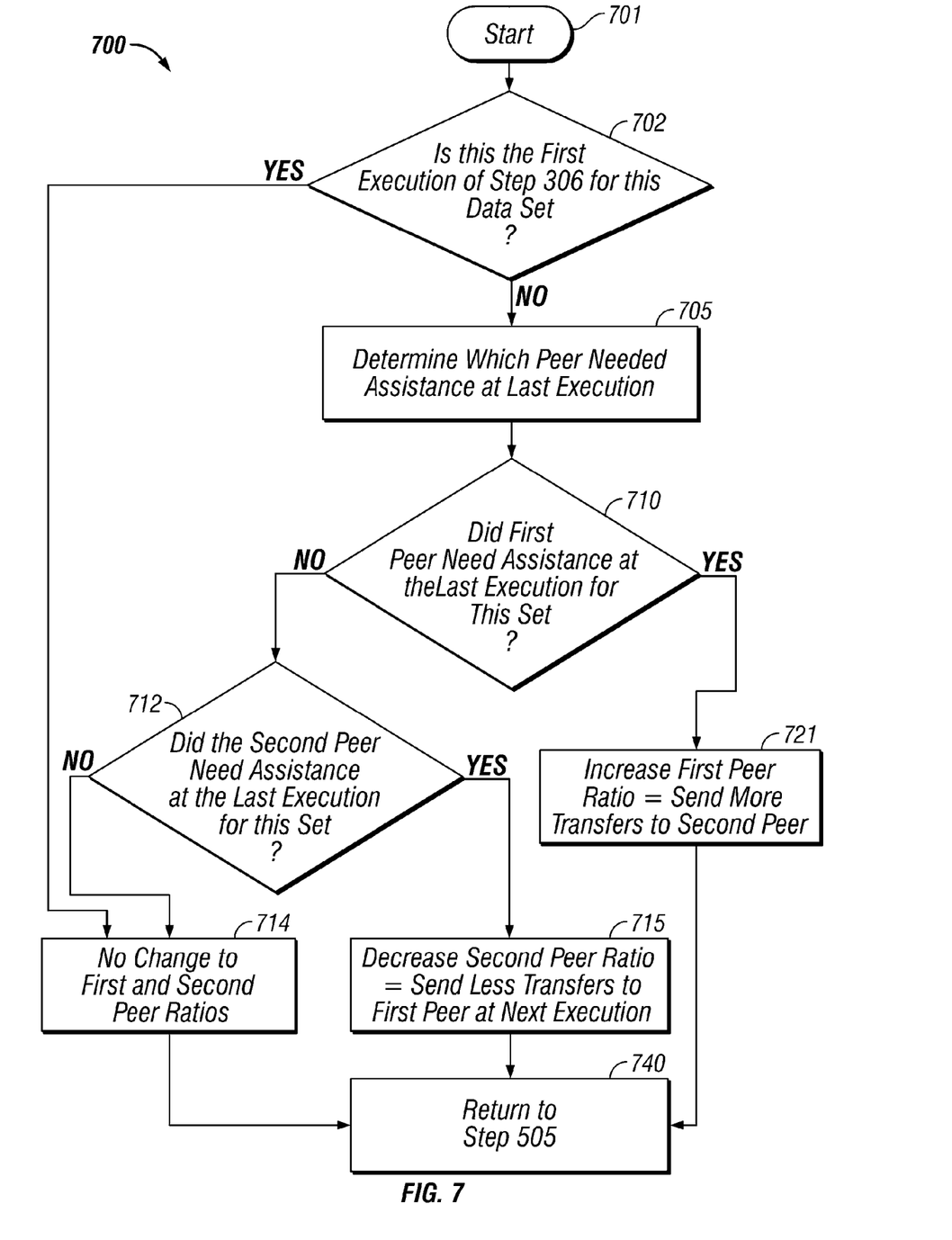
FIG. 7 is a flowchart of the method used to determine the first and second peer ratios when the first peer computer needs assistance.

One implementation of step 502 to determine the first and second peer ratios is detailed by flowchart 700 shown in FIG. 7. If this is the first execution of step 306 for this data set then step 702 transfers control to step 714, resulting in no change to the first or second peer ratios. The first and second peer ratios are not changed if this is the first execution of step 306 for this data set because the ratios are either at an initial value or at a value as the result of previous adjustments from the operation of the present invention. The second peer ratio and the first peer ratio are only changed as a result of either peer node 1 214 or peer node 2 215 accepting assistance with data transfers on a previous execution of steps 310 or 311 for the present data set that is being transferred to one or more storage devices. The present invention uses the previous values for second peer ratio and the first peer ratio for the first instance of either peer needing assistance with data transfers for the present data set. Each time a new data set is received the present invention begins operation at step 301.

Figure 5:
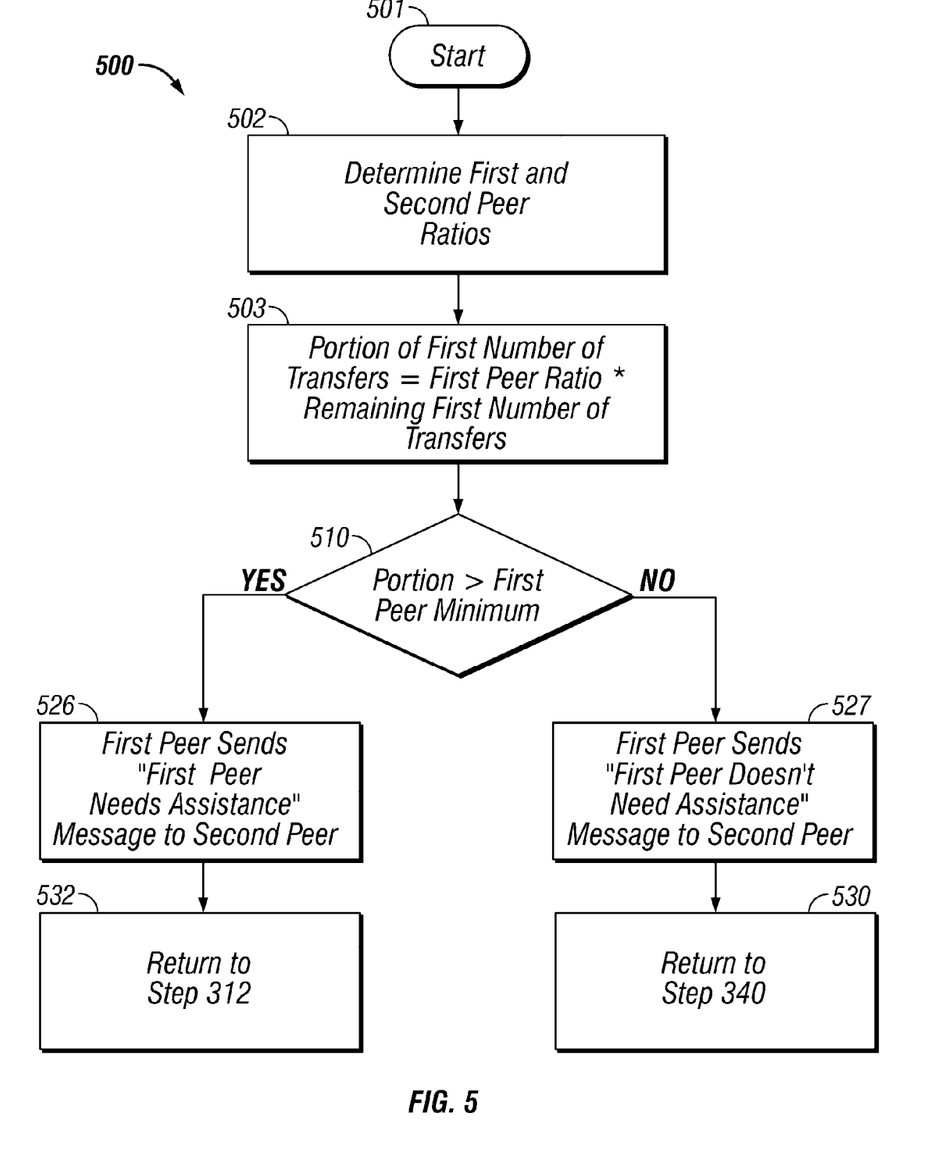
FIG. 5 is a flowchart of the method used to determine if a first peer needs assistance to transfer data to storage devices.

After execution of step 714, step 740 is executed resulting in returning back to execution of step 503 of flowchart 500 shown in FIG. 5. If this is not the first execution of step 306 for this data set, then step 702 transfers control to step 705, where a determination of which peer needed assistance after execution of the steps that follow step 306 (FIG. 3) for the present data set is made. If at the previous execution of the steps that follow step 306 for the present data set, peer node 1 245 needed assistance, then step 710 transfers control to step 721. At step 721 the first peer ratio is increased resulting in a larger portion of the second number of transfers being assigned to peer node 2 215 when step 312 is executed (explained below). The first peer ratio is increased or decreased by a first increment value. The first increment is optimized to have a fast response to changing conditions and also to provide a stable system. After execution of step 721, step 740 is executed resulting in returning back to execution of step 503 of flowchart 500 shown in FIG. 5.

If at the previous execution of the steps that follow step 306 for the present data set, peer node 1 214 did not need assistance, then step 710 transfers control to step 712. If at step 712 it is determined that the previous execution of the steps that follow step 306 for the present data set, peer node 2 215 needed assistance, then step 712 transfers control to step 715. At step 715 the second peer ratio is decreased resulting in a smaller portion of the second number of transfers being assigned to peer node 1 214 the next time step 313 (explained above) is executed. After execution of step 715, step 740 is executed resulting in returning back to execution of step 503 of flowchart 500 shown in FIG. 5.

If at step 712 it is determined that the previous execution of the steps that follow step 306 for the present data set, peer node 2 215 did not need assistance, then step 712 transfers control to step 714, resulting in no change to the second peer ratio. After execution of step 714, step 740 is executed resulting in returning back to execution of step 503 of flowchart 500 shown in FIG. 5.

At step 503 a calculation of a portion of the first number of transfers is executed using the results of step 502. The portion of the first number of transfers is equal to the first peer ratio multiplied by the remaining first number of transfers. The remaining first number of transfers is the difference between the first number of transfers that peer node 1 214 originally had responsibility for offloading and the first number of transfers that peer node 1 214 has already transferred to the storage devices. The remaining first number of transfers is a positive number. The first peer ratio is the ratio of the portion of remaining first number of transfers to the remaining first number of transfers. The first peer ratio is dynamically adjusted during the operation of the present invention and is described in detail above.

At step 510 the portion of the first number of transfers is compared to a first peer minimum. The first peer minimum is the minimum number of transfers necessary for peer node 2 215 to assist peer node 1 214 with data transfers. The first peer minimum is necessary to prevent peer node 1 214 from sending data transfers to peer node 2 215 if the first number of transfers is small enough that by the time peer node 2 215 would be able to complete the transfers, peer node 1 214 could have completed the transfers. The first peer minimum is determined in a similar manner as the second peer minimum is determined and described above. The first peer minimum must be large enough for it to be advantageous for peer node 2 215 to assist peer node 1 214 with data transfers after accounting for the overhead of the communications between the peers and other delays necessary to complete the entire operation. It is expected that the second peer minimum may vary dynamically.

If at step 510 the portion of the first number of transfers is less than or equal to the first peer minimum then step 527 is executed. At step 527 peer node 1 214 sends a "peer node 1 214 does not need assistance" message to peer node 2 215 and then executes step 530. When peer node 2 215 receives the "peer node 1 214 does not need assistance" message from peer node 1 214, peer node 2 215 takes no further action to assist peer node 1 214 until step 340 is executed. At step 530 the control returns to flowchart 300 (FIG. 3) at step 340. Execution of step 340 and the steps that follow step 340 are explained below.

If at step 510 the portion of the first number of transfers is greater than the first peer minimum then step 526 is executed. At step 526 peer node 1 214 sends a "peer node 1 214 needs assistance" message to peer node 2 215. This starts a process that will result in peer node 2 215 being assigned the responsibility for transferring the portion of the first number of transfers (explained below). Step 532 is executed after execution of step 526. At step 532 the control returns to flowchart 300 (FIG. 3) at step 312.

Execution of step 312 and the steps that follow step 312 are now explained. Step 312 is executed as a result of a determination at step 310 that peer node 1 214 needs assistance with data transfers. At step 312, peer node 2 215 is assigned responsibility for transferring the portion of the first number of transfers to the storage devices. At step 316 peer node 2 215 receives transfer information from peer node 1 214. The transfer information includes exact information on the portion of the first number of transfers that are reassigned to peer node 2 215. Peer node 2 215 receives the information specifying the portion of the first number of transfers and assigns the portion of the first number of data transfers as the second number of data transfers so that peer node 2 215 operates on the data transfers in the same manner as the second number of data transfers that peer node 2 215 was assigned at step 302. At step 316 the first and second peer ratios are adjusted according to the determination made at step 502. The first and second peer ratios are adjusted as a result of the decision at step 310 that peer node 1 214 needs assistance with data transfers.

At step 318 peer node 2 215 begins to transfer the data to one or more storage devices. Peer node 1 214 continues to transfer the remaining second number of transfers calculated at step 503 (explained above). After execution of step 318, step 340 is executed. Execution of step 340 and the steps that follow step 340 are explained below.

Execution of step 340 results from the execution of any of steps 306, 310, 311, 318, or 319. At step 340 the progress of peer node 1 214 and peer node 2 215 is examined to determine if one both of the peers have completed transferring data to the storage devices. If peer node 1 214 or peer node 2 215 did not finish transferring data for the data set the control flows back to step 306 where the process repeats. If at step 340 peer node 1 214 and peer node 2 215 have both finished transferring data for the data set then control flows to step 345 where the process ends until the next data set is received While the preferred embodiments of the present invention have been illustrated in detail, the skilled artisan will appreciate that modifications and adaptations to those embodiments may be made without departing from the scope of the present invention as set forth in the following claims.

What is claimed is:

1. A method for a first peer and a second peer to share a plurality of data transfers to one or more storage devices, said first peer and said second peer each having access to said data transfers, where said method comprises the steps of:
   1.1. said first peer transferring a first number of data transfers to said one or more storage devices;
   1.2. said second peer transferring a second number of data transfers to said one or more storage devices;
   1.3. in response to said first peer completing said transfer of said first number of data transfers to said one or more storage devices, said first peer assisting said second peer with said second number of data transfers;
   1.4. in response to said second peer completing said transfer of said second number of data transfers to said one or more storage devices, said second peer assisting said first peer with said first number of data transfers; and
   1.5. in response to said first peer and said second peer not completing all data transfers, returning to step 1.3.

2. The method of claim 1, wherein step 1.3 further comprises the steps of:
   2.1. determining if said second peer needs assistance to transfer said second number of data transfers to said one or more storage devices;
   2.2. in response to determining that said second peer needs assistance to transfer said second number of data transfers to said one or more storage devices:
      2.2.1. assigning a portion of said second number of data transfers from said second peer to said first peer as said first number of data transfers;
      2.2.2. adjusting a first peer ratio and a second peer ratio; and
      2.2.3. said first peer transferring said portion of said second number of data transfers to said one or more storage devices.

3. The method of claim 1, wherein step 1.4 further comprises the steps of:
   3.1. determining if said first peer needs assistance to transfer said first number of data transfers to said one or more storage devices;
   3.2. in response to determining that said first peer needs assistance to transfer said first number of data transfers to said one or more storage devices:
      3.2.1. adjusting a first peer ratio and a second peer ratio;
      3.2.2. assigning a portion of said first number of data transfers from said first peer to said second peer as said second number of data transfers; and
      3.2.3. said second peer transferring said portion of said first number of data transfers to said one or more storage devices.

4. The method of claim 2, wherein step 2.1 further comprises the steps of:
   4.1. determining a first peer ratio and a second peer ratio;
   4.2. determining a portion of second number of transfers that is equal to said second peer ratio multiplied by a remaining second number of transfers;
   4.3. in response to said portion of second number of transfers being greater than a second peer minimum number of transfers, said second peer sending an "assistance needed" message to said first peer; and
   4.4. in response to said portion of second number of transfers being less than or equal to said second peer minimum number of transfers, said second peer sending a "no assistance needed" message to said first peer.

5. The method of claim 3, wherein step 3.1 further comprises the steps of:
   5.1. determining a first peer ratio and a second peer ratio;
   5.2. determining a portion of first number of transfers that is equal to said first peer ratio multiplied by a remaining first number of transfers;
   5.3. in response to said portion of first number of transfers being greater than a first peer minimum number of transfers, said first peer sending an "assistance needed" message to said second peer; and
   5.4. in response to said portion of first number of transfers being less than or equal to said first peer minimum number of transfers, said first peer sending a "no assistance needed" message to said second peer.

6. The method of claim 4, wherein step 4.1 further comprises:
   6.1. in response to determining that said first peer assisted said second peer with said second number of data transfers at the previous execution of step 1.3, increasing said second peer ratio by a second increment; and
   6.2. in response to determining that said second peer assisted said first peer with said first number of data transfers at the previous execution of step 1.4, decreasing said first peer ratio by a first increment.

7. The method of claim 5, wherein step 5.1 further comprises:
- 7.1. in response to determining that said second peer assisted said first peer with said first number of data transfers at the previous execution of step 1.4, increasing said first peer ratio by a first increment;
- 7.2. in response to determining that said first peer assisted said second peer with said second number of data transfers at the previous execution of step 1.3, decreasing said second peer ratio by a second increment.

8. An article of manufacture comprising a non-transitory data storage medium tangibly embodying a program of machine-readable instructions executable by a digital processing apparatus to perform method steps for a first peer and a second peer to share a plurality of data transfers to one or more storage devices, said first peer and said second peer each having access to said data transfers, said method steps comprising:
- 8.1. said first peer transferring a first number of data transfers to said one or more storage devices;
- 8.2. said second peer transferring a second number of data transfers to said one or more storage devices;
- 8.3. in response to said first peer completing said transfer of said first number of data transfers to said one or more storage devices, said first peer assisting said second peer with said second number of data transfers;
- 8.4. in response to said second peer completing said transfer of said second number of data transfers to said one or more storage devices, said second peer assisting said first peer with said first number of data transfers; and
- 8.5. in response to said first peer and said second peer not completing all data transfers, returning to step 8.3.

9. The article of manufacture of claim 8, wherein step 8.3 further comprises the steps of:
- 9.1. determining if said second peer needs assistance to transfer said second number of data transfers to said one or more storage devices;
- 9.2. in response to determining that said second peer needs assistance to transfer said second number of data transfers to said one or more storage devices:
  - 9.2.1. assigning a portion of said second number of data transfers from said second peer to said first peer as said first number of data transfers;
  - 9.2.2. adjusting a first peer ratio and a second peer ratio; and
  - 9.2.3. said first peer transferring said portion of said second number of data transfers to said one or more storage devices.

10. The article of manufacture of claim 8, wherein step 8.4 further comprises the steps of:
- 10.1. determining if said first peer needs assistance to transfer said first number of data transfers to said one or more storage devices;
- 10.2. in response to determining that said first peer needs assistance to transfer said first number of data transfers to said one or more storage devices:
  - 10.2.1. adjusting a first peer ratio and a second peer ratio;
  - 10.2.2. assigning a portion of said first number of data transfers from said first peer to said second peer as said second number of data transfers; and
  - 10.2.3. said second peer transferring said portion of said first number of data transfers to said one or more storage devices.

11. The article of manufacture of claim 9, wherein step 9.1 further comprises the steps of:
- 11.1. determining a first peer ratio and a second peer ratio;
- 11.2. determining a portion of second number of transfers that is equal to said second peer ratio multiplied by a remaining second number of transfers;
- 11.3. in response to said portion of second number of transfers being greater than a second peer minimum number of transfers, said second peer sending an "assistance needed" message to said first peer; and
- 11.4. in response to said portion of second number of transfers being less than or equal to said second peer minimum number of transfers, said second peer sending a "no assistance needed" message to said first peer.

12. The article of manufacture of claim 10, wherein step 10.1 further comprises the steps of:
- 12.1. determining a first peer ratio and a second peer ratio;
- 12.2. determining a portion of first number of transfers that is equal to said first peer ratio multiplied by a remaining first number of transfers;
- 12.3. in response to said portion of first number of transfers being greater than a first peer minimum number of transfers, said first peer sending an "assistance needed" message to said second peer; and
- 12.4. in response to said portion of first number of transfers being less than or equal to said first peer minimum number of transfers, said first peer sending a "no assistance needed" message to said second peer.

13. The article of manufacture of claim 11, wherein step 11.3 further comprises the steps of:
- 13.1. in response to determining that said first peer assisted said second peer with said second number of data transfers at the previous execution of step 8.3, increasing said second peer ratio by a second increment; and
- 13.2. in response to determining that said second peer assisted said first peer with said first number of data transfers at the previous execution of step 8.4, decreasing said first peer ratio by a first increment.

14. The article of manufacture of claim 12, wherein step 12.1 further comprises the steps of:
- 14.1. in response to determining that said second peer assisted said first peer with said first number of data transfers at the previous execution of step 8.4, increasing said first peer ratio by a first increment;
- 14.2. in response to determining that said first peer assisted said second peer with said second number of data transfers at the previous execution of step 8.3, decreasing said second peer ratio by a second increment.

15. A data storage system comprising:
one or more storage devices;
a storage management device for providing access to said one or more storage devices; a first peer for transferring data to said one or more storage devices;
a second peer for transferring data to said one or more storage devices, wherein said first peer and said second peer are programmed to perform method steps for said first peer and said second peer to share a plurality of data transfers to said one or more storage devices, said first peer and said second peer each having access to said data transfers, comprising the steps of:
- 15.1. said first peer transferring a first number of data transfers to said one or more storage devices;
- 15.2. said second peer transferring a second number of data transfers to said one or more storage devices;
- 15.3. in response to said first peer completing said transfer of said first number of data transfers to said one or more storage devices, said first peer assisting said second peer with said second number of data transfers;

15.4. in response to said second peer completing said transfer of said second number of data transfers to said one or more storage devices, said second peer assisting said first peer with said first number of data transfers; and 15.5. in response to said first peer and said second peer not completing all data transfers, returning to step 15.3.

16. The system of claim 15, wherein step 15.3 further comprises the steps of:

16.1. determining if said second peer needs assistance to transfer said second number of data transfers to said one or more storage devices;

16.2. in response to determining that said second peer needs assistance to transfer said second number of data transfers to said one or more storage devices:

16.2.1. assigning a portion of said second number of data transfers from said second peer to said first peer as said first number of data transfers;

16.2.2. adjusting a first peer ratio and a second peer ratio; and 16.2.3. said first peer transferring said portion of said second number of data transfers to said one or more storage devices.

17. The system of claim 15, wherein step 15.4 further comprises the steps of:

17.1. determining if said first peer needs assistance to transfer said first number of data transfers to said one or more storage devices;

17.2. in response to determining that said first peer needs assistance to transfer said first number of data transfers to said one or more storage devices:

17.2.1. adjusting a first peer ratio and a second peer ratio;

17.2.2. assigning a portion of said first number of data transfers from said first peer to said second peer as said second number of data transfers; and 17.2.3. said second peer transferring said portion of said first number of data transfers to said one or more storage devices.

18. The system of claim 16, wherein step 16.1 further comprises the steps of:

18.1. determining a first peer ratio and a second peer ratio;

18.2. determining a portion of second number of transfers that is equal to said second peer ratio multiplied by a remaining second number of transfers;

18.3. in response to said portion of second number of transfers being greater than a second peer minimum number of transfers, said second peer sending an "assistance needed" message to said first peer; and 18.4. in response to said portion of second number of transfers being less than or equal to said second peer minimum number of transfers, said second peer sending a "no assistance needed" message to said first peer.

19. The system of claim 17, wherein step 17.1 further comprises the steps of:

19.1. determining a first peer ratio and a second peer ratio;

19.2. determining a portion of first number of transfers that is equal to said first peer ratio multiplied by a remaining first number of transfers;

19.3. in response to said portion of first number of transfers being greater than a first peer minimum number of transfers, said first peer sending an "assistance needed" message to said second peer; and 19.4. in response to said portion of first number of transfers being less than or equal to said first peer minimum number of transfers, said first peer sending a "no assistance needed" message to said second peer.

20. The system of claim 18, wherein step 18.1 further comprises:

20.1. in response to determining that said first peer assisted said second peer with said second number of data transfers at the previous execution of step 15.3, increasing said second peer ratio by a second increment; and 20.2. in response to determining that said second peer assisted said first peer with said first number of data transfers at the previous execution of step 15.4, decreasing said first peer ratio by a first increment.

21. The system of claim 19, wherein step 19.1 further comprises:

21.1. in response to determining that said second peer assisted said first peer with said first number of data transfers at the previous execution of step 15.4, increasing said first peer ratio by a first increment;

21.2. in response to determining that said first peer assisted said second peer with said second number of data transfers at the previous execution of step 15.3, decreasing said second peer ratio by a second increment.

* * * * *